(12) United States Patent
Shiota

(10) Patent No.: US 6,657,692 B2
(45) Date of Patent: Dec. 2, 2003

(54) TRANSMISSION LIQUID CRYSTAL DISPLAY AND METHOD OF FORMING THE SAME

(75) Inventor: Kunihiro Shiota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/836,506

(22) Filed: Apr. 18, 2001

(65) Prior Publication Data

US 2002/0008818 A1 Jan. 24, 2002

(30) Foreign Application Priority Data

Apr. 19, 2000  (JP) ...................................... 2000-117585

(51) Int. Cl.⁷ ............................................ G02F 1/1333
(52) U.S. Cl. ........................................ 349/138; 430/30
(58) Field of Search ............................. 349/138, 122; 430/30; 438/717

(56) References Cited

U.S. PATENT DOCUMENTS

| | | | | |
|---|---|---|---|---|
| 5,670,421 A | * | 9/1997 | Nishitani et al. ............ 438/641 |
| 6,052,162 A | * | 4/2000 | Shinada et al. ............... 349/38 |
| 6,097,452 A | * | 8/2000 | Shinada et al. ............... 349/38 |
| 6,100,954 A | * | 8/2000 | Kim et al. ................... 349/138 |
| 6,204,192 B1 | * | 3/2001 | Zhao et al. .................. 438/723 |
| 6,330,043 B1 | * | 12/2001 | Kikkawa et al. .............. 349/43 |
| 6,365,916 B1 | * | 4/2002 | Zhong et al. ................. 257/59 |
| 6,411,356 B1 | * | 6/2002 | Kim et al. ................... 349/138 |
| 6,429,916 B1 | * | 8/2002 | Nakata et al. ............... 349/106 |
| 6,458,613 B1 | * | 10/2002 | Bae ............................ 438/30 |

* cited by examiner

*Primary Examiner*—Kenneth Parker
(74) *Attorney, Agent, or Firm*—Young & Thompson

(57) ABSTRACT

A method for cleaning a hole in a layered structure having a planarized transparent organic surface comprises the step of exposing said hole to sputtered particles or plasma particles in the presence of a transparent protection layer which covers said planarized transparent organic surface, except within said hole, for protecting said planarized transparent organic surface from said particles.

30 Claims, 21 Drawing Sheets

Sputter Cleaning (Sputter Etching)

Plasma Ashing

Sputter Cleaning (Sputter Etching)

Plasma Ashing

TRANSMISSION LIQUID CRYSTAL DISPLAY AND METHOD OF FORMING THE SAME

BACKGROUND OF THE INVENTION

1. Field of the Invention

The present invention relates to a transmission liquid crystal display and a method of forming the same, and more particularly to a transmission liquid crystal display with an improved contact hole structure and a method of forming such contact holes therein.

2. Description of the Related Art

In recent years, liquid crystal displays have widely been used in various fields due to their advantageous light weight and low power consumption. A transmission active matrix liquid crystal display is a highly attractive liquid crystal display. Such a display has an active matrix substrate and an opposite substrate, which together define an inter-space filled with liquid crystal. The active matrix substrate has plural thin film transistors, which serve as switching devices for switching display pixels, wherein the display pixels are provided over the active matrix substrate. The opposite substrate is transparent, for allowing transmission of light. It is important for such a display to have improved contrast and color and also increased display screen area.

In order to achieve such improvements, it is necessary to increase transmittivity of a back-light emitted from a back-illuminator, which illuminates a liquid crystal panel.

Advanced liquid crystal displays reduced weight, thickness and power consumption. In order to reduce power consumption, it is quite effective to save or reduce a power consumption by the back-illuminator.

Regarding improved transmittivity of the back-light, it is effective to increase an aperture efficiency of a display portion, which includes pixels. In view of increasing the aperture efficiency, the display has the following structural elements.

The liquid crystal device has a planarized transparent organic insulating film, which covers entire regions including the interconnections coupled with the electrodes and the thin fm transistors, wherein an aperture comprises a transparent film which permits light-transmission. An inter-layer insulator as a protector is further provided, which overlies the substrate and underlies the planarized transparent organic insulating film. Transparent pixel electrodes are provided over such a planarized transparent film. Contact holes are formed, which penetrate laminations of the planarized transparent organic insulating film and the inter-layer insulator, so that contact plugs are then formed in the contact holes, whereby the transparent pixel electrodes over the planarized transparent film are electrically connected through the contact plugs to interconnections, which underlie the inter-layer insulator, wherein the interconnections are coupled with the electrodes of the thin film transistors over the substrate.

The above inter-layer insulator comprises an inorganic insulating film, whilst the planarized transparent film comprises an organic insulating film. This means that the contact holes penetrate the laminations of the organic and inorganic films. The contact holes are formed by an etching process for selectively etching such laminations, before the contact holes are filled with the contact plugs by a sputtering process. The etching process and the subsequent sputtering process, however, damage the planarized transparent organic insulating film, whereby the film is deteriorated in light-transmittivity. This means that the light-transmittivity of the apertures is reduced.

Japanese laid-open patent publication No 10-20342 discloses contact holes which penetrate laminations of an overlying photo-sensitive organic insulating layer and an underlying inorganic insulating layer. A photo-lithography technique may be utilized to form the contact holes in the overlying photo-sensitive organic insulating layer, before a dry etching process is carried out with use of the processed overlying layer as a mask for forming the contact holes. The dry etching process uses an etching gas which contains carbon, fluorine and hydrogen in order to prevent deterioration of the overlying photo-sensitive organic insulating layer and also prevent the underlying layer from side-etch.

Japanese laid-open patent publication No. 11-283934 discloses another conventional technique to prevent any substantal increase in a resistance value of the contact plug in the contact hole. Contact holes are formed in a transparent resin inter-layer insulator by an etching process, by which residues remain on bottoms of the contact holes. A further sputter cleaning process is carried out to remove residues from the bottoms of the contact holes because the residues may increase the resistance, wherein the residues are removed by impacts of sputtered particles in hydrogen, helium or nitrogen atmosphere.

FIG. 1A is a fragmentary cross sectional elevation view of such a sputter cleaning process for removing the residues from the contact holes. The planarized top surface of the transparent organic film 8 is directly exposed to the sputtered particles, whereby the planarized surface becomes a rough surface 17a, and an upper region 17b of the transparent organic film 8 is damaged and deteriorated in film quality. FIG. 1B is a fragmentary cross sectional elevation view of the transparent organic film with the damaged upper region by the sputter cleaning process of FIG. 1A. The above organic film 8 has a C—C bonding structure. In the upper region 17b of the organic film 8, this C—C bonding structure may be broken by the sputtered particles, whereby the molecular structure of the upper region 17b is changed, for example, side chains of the molecule structure are broken. As a result, the above rough surface 17a is formed. This rough surface 17a causes a remarkable decrease in light-transmittivity of the transparent organic film 8.

In the above circumstances, it would be advantageous to develop a novel transmission liquid crystal display and method of forming the same free from the above problems.

SUMMARY OF THE INVENTION

Accordingly, it is an object of the present invention to provide a novel transmission liquid crystal display and method of forming the same free from the above problems.

In accordance with the present invention, a method for cleaning a hole in a layered structure having a planarized transparent organic surface comprises the step of exposing said hole to sputtered particles or plasma particles in the presence of a transparent protection layer which covers said planarized transparent organic surface, except within said hole, for protecting said planarized transparent organic surface from said particles.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIGS. 3A through 3K are fragmentary cross sectional views of liquid crystal displays in sequential steps involved in the novel manufacturing method in a first preferred embodiment in accordance with the present invention.

DETAILED DESCRIPTION

Figure 1A:
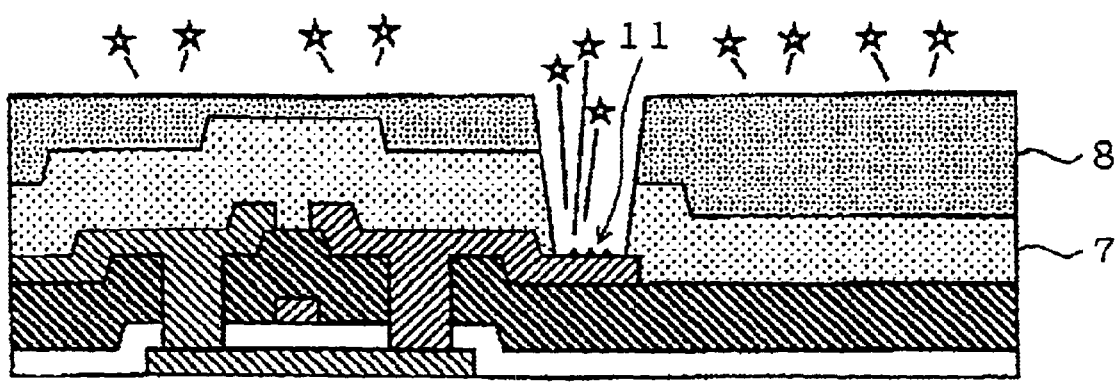
FIG 1A is a fragmentary cross sectional elevation view of such a sputter cleaning process for removing the residues from the contact holes.
Figure 1B:
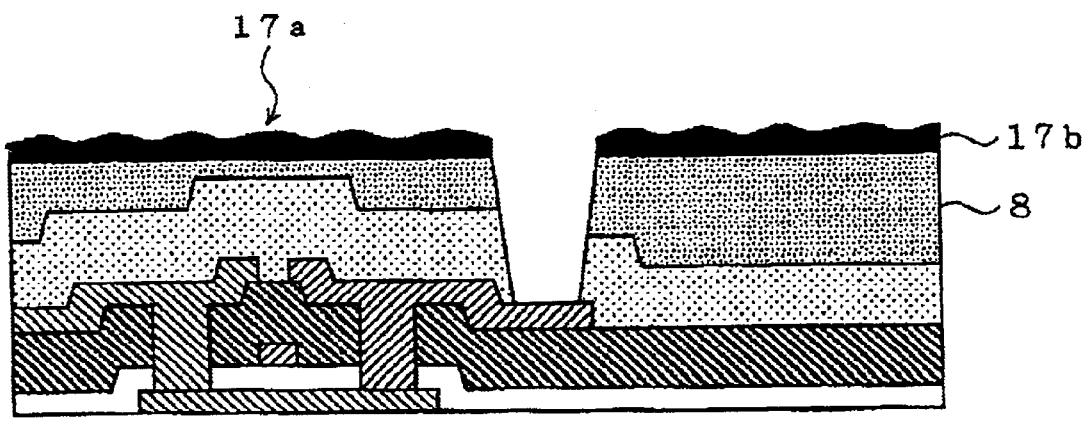
FIG. 1B is a fragmentary cross sectional elevation view of the transparent organic film with the damaged upper region by the sputter cleaning process of FIG. 1A.

A first aspect of the present invention is a method for cleaning a hole in a layered structure having a planarized transparent organic surface, comprising the step of exposing said hole to sputtered particles or plasma particles in the presence of a transparent protection layer which covers said planarized transparent organic surface, except within said hole, for protecting said planarized transparent organic surface from said particles.

The transparent protection layer protects the planarized transparent organic surface from the sputtered particles in the sputter cleaning process or the plasma particles in the plasma ashing process for removing residues from the hole, whereby the planarized transparent organic surface is free from any damage and any deterioration in film quality by breaking molecular structure. After such a cleaning process, the layered structure keeps the planarized transparent organic surface which is free of any substantive or large roughness. This planarized transparent organic surface provides a high light-transmittivity.

It is preferable that the transparent protection layer has a light-transmittivity of not less than 90% under a condition of a vertical incident of a light having a wavelength in the range of 400–800 nanometers, provided that the light-transmittivity is represented by a ratio in quantity of a transmitted light to a vertically incident light.

It is also preferable that the transparent protection layer has a gas-permeability. After the transparent protection layer has been formed, a heat treatment may be carried out, whereby a gas is generated from the transparent organic material under the transparent protection layer. Since, however, the transparent protection layer has the gas-permeability, the generated gas is permeated through the transparent protection layer and discharged to an atmosphere, thereby causing no accumulation of the generated gas on the interface between the transparent protection layer and the planarized transparent organic surface. Such no accumulation of the generated gas does not cause the transparent protection layer to be peeled from the planarized transparent organic surface. It is preferable for achieving the above effects that the transparent protection layer has a relative film density in the range of 50–90%.

It is preferable that the transparent protection layer has a thickness of at least about 15 nanometers for exhibiting a sufficient effect of protecting the planarized transparent organic surface from the sputtered particles or the plasma particles. The thickness is more preferably in the range of at least 20 nanometers to at most about 40 nanometers. If the thickness of the transparent protection layer is much thinner than 15 nanometers, then it is possible that the transparent protection layer does not exhibit the sufficient effect of protecting the planarized transparent organic surface from the sputtered particles or the plasma particles. If the thickness of the transparent protection layer is further increased from 40 nanometers, then no further advantage can be obtained.

It is also preferable that the layered structure comprises laminations of an underlying inorganic inter-layer insulator and an overlying transparent organic insulating layer having the planarized transparent organic surface, provided that the hole penetrates the overlying transparent organic insulating layer and the underlying inorganic inter-layer insulator. The underlying inorganic inter-layer insulator has a surface which varies in level such as a stepped surface, whilst the overlying transparent organic insulating layer has the planarized transparent organic surface.

The hole may comprise either a contact hole or a through hole.

The above cleaning process may comprise either a sputter cleaning process with the sputtered particles or the plasma-ashing process with the plasma particles.

A second aspect of the present invention is a method of forming a hole in a layered structure having a planarized transparent organic surface. The method comprises the steps of: forming a transparent protection layer which covers the planarized transparent organic surface; carrying out an anisotropic etching for selectively etching the transparent protection layer and the layered structure to form a hole in the layered structure; and exposing said hole to sputtered particles or plasma particles in the presence of a transparent protection layer which covers said planarized transparent organic surface, except within said hole, for protecting said planarized transparent organic surface from said particles.

This second aspect of the present invention has the same characteristics described above in connection with the cleaning method of the first aspect of the present invention.

A third aspect of the present invention is a method of forming a hole in a layered structure having a planarized transparent organic surface. The method comprises the steps of: carrying out an anisotropic etching for selectively etching the layered structure to form a hole in the layered structure; forming a transparent protection layer on the planarized transparent organic surface and on a bottom and side walls of the hole; selectively removing the transparent protection layer from the bottom and the side walls of the hole, so as to leave the transparent protection layer on the planarized transparent organic surface only; and exposing said hole to sputtered particles or plasma particles in the presence of a transparent protection layer which covers said planarized transparent organic surface, except within said hole, for protecting said planarized transparent organic surface from said particles.

This third aspect of the present invention has the same characteristics described above in connection with the cleaning method of the first aspect of the present invention.

A fourth aspect of the present invention is a layered structure comprising: a transparent organic layer having a planarized transparent organic surface and a hole; and a first transparent layer overlying the planarized transparent organic surface only except within the hole.

It is preferable to further comprise a second transparent layer, which has an electrical conductivity and extends over the transparent protection layer and on a bottom and side walls of the hole. The first and second transparent layers may be made of the same martial. Such a martial may be either indium tin oxide or silicon dioxide. The first transparent layer may comprise a transparent protection layer, and the second transparent layer may comprise a transparent pixel electrode layer.

It is preferable to further comprise an orientation film extending over the transparent pixel electrode layer and within the hole, wherein the orientation film is in contact with a liquid crystal.

The effect of providing the transparent protection layer which covers the planarized transparent organic surface except within the hole is the same as described in connection with the above first aspect of the present invention.

A fifth aspect of the present invention is a transparent liquid crystal display comprising: a first substrate; an inorganic inter-layer insulator layer extending adjacent to the first substrate; a transparent organic layer having a planarized transparent organic surface and a hole, the transparent organic layer extending adjacent to the first substrate; a transparent protection layer covering the planarized transparent organic surface except within the hole; a transparent pixel electrode layer extending adjacent to the transparent protection layer and on a bottom and side walls of the hole; a first orientation film extending over the transparent pixel electrode layer and within the hole; a liquid crystal adjacent to the first orientation film; a second orientation film adjacent to the liquid crystal; an opposite electrode film adjacent to the second orientation film; and a second substrate adjacent to the opposite electrode film.

This fifth aspect of the present invention has the same characteristics described above in connection with the first and fourth aspects of the present invention.

Throughout this specification, the word "sputter cleaning process" means a sputter etching process for removing the residues from the hole with sputtered particles.

PREFERRED EMBODIMENTS

First Embodiment

Figure 2:
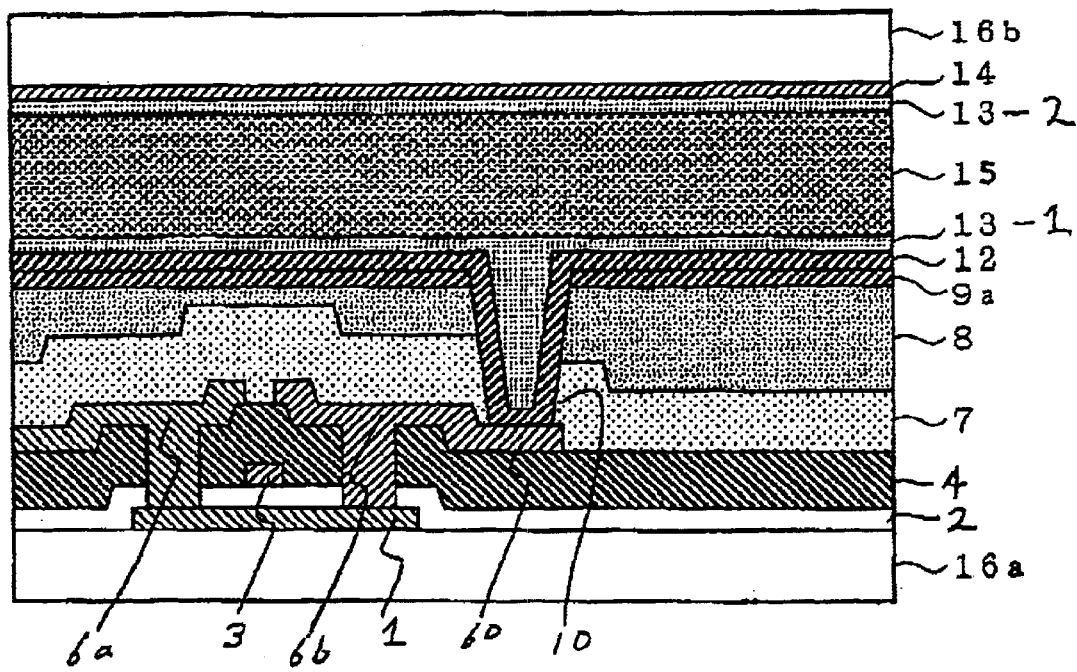
FIG. 2 is a fragmentary cross sectional view of a transparent liquid crystal display in accordance with the present invention.

A first embodiment according to the present invention will be described in detail with reference to the drawings. FIG. 2 is a fragmentary cross sectional view of a transparent liquid crystal display in accordance with the present invention. The transparent liquid crystal display has first and second insulating substrates 16a and 16b. A thin film transistor silicon layer 1 is selectively provided on a predetermined region of a top surface of the first insulating substrate 16a. The silicon layer 1 for thin film transistor has a thickness in the range of 30–100 nanometers. The silicon layer 1 may comprise a single crystal silicon layer or a polycrystal silicon layer A gate insulating film 2 is provided, which extends over the thin film transistor silicon layer 1 and the remaining region of the top surface of the first insulating substrate 16a. The gate insulating film 2 has a thickness in the range of 10–100 nanometers. The gate insulating film 2 may be made of a silicon-based insulator such as a silicon dioxide. A gate electrode interconnection 3 is selectively provided on the gate insulating film 2, so that the gate electrode interconnection 3 is positioned indirectly over the silicon layer 1, wherein the gate electrode interconnection 3 is separated from the silicon layer 1 by the gate insulating film 2. The gate electrode interconnection 3 may have a single layered structure, or a laminated structure. The gate electrode interconnection 3 may comprise any of various metal layers, for example, Al, Mo, W, and Ta layers and various metal silicide layers, for example, AlSi, AlCuSi, TiSi, MoSi and WSi layers alone or in combination.

A first inter-layer insulator 4 is provided, which extends over a top surface of the gate insulating film 2 and over the gate electrode interconnection 3, The first inter-layer insulator 4 may be made of a silicon based insulator such as silicon dioxide. The first inter-layer insulator 4 may have a thickness in the range of 100–500 nanometers. A pair of contact holes 5a and 5b is formed in the lamination of the first inter-layer insulator 4 and the gate insulating film 2, so that the contact holes 5a and 5b reach parts of the top surface of the silicon layer 1.

Source and drain electrodes 6a and 6b are selectively provided on a top surface of the first inter-layer insulator 4, wherein the source and drain electrodes 6a and 6b are electrically connected through first and second contact plugs in the contact holes 5a and 5b to the silicon layer 1. The source and drain electrodes 6a and 6b are connected to first level interconnection layers 60 which extends over the top surface of the first inter-layer insulator 4. The source and drain electrodes 6a and 6b, the first and second contact plugs and the first level interconnection layers 60 may comprise a unitary-formed conductive layer such as an aluminum layer.

A second inter-layer insulator 7 is provided, which extends over the top surface of the first inter-layer insulator 4 and also over the source and drain electrodes 6a and 6b and the first level interconnection layers 60. The second inter-layer insulator 7 may be made of an inorganic insulating material, for example, silicon-based insulator such as silicon dioxide. The second inter-layer insulator 7 may have a thickness in the range of 300–800 nanometers. The gate insulating layer 2 has a single-stepped surface. The first inter-layer insulator 4 has a dual-stepped surface. The second inter-layer insulator 7 has a triplet-stepped surface. As described above, the second inter-layer insulator 7 may be made of the inorganic insulating material.

A transparent organic insulating layer 8 having a planarized top surface is provided over the second inter-layer insulator 7. It is possible that the transparent organic insulating layer 8 is provided directly over the top surface of the first inter-layer insulator 4 and also over the source and drain electrodes 6a and 6b and the first level interconnection layers 60 without providing the second inter-layer insulator 7. It is, however, preferable that the second inter-layer insulator 7 is provided directly over the top surface of the first inter-layer insulator 4 and also over the source and drain electrodes 6a and 6b and the first level interconnection layers 60, and the transparent organic insulating layer 8 having a planarized top surface is provided over the second inter-layer insulator 7. A contact hole 10 is formed in the lamination of the transparent organic insulating layer 8 and the second inter-layer insulator 7, so that the contact hole 10 reaches a part of a top surface of the first level interconnection layer 60.

A transparent protection layer 9a is provided on the planarized top surface of the transparent organic insulating layer 8, provided that the transparent protection layer 9a does not extend on side walls and a bottom of the contact hole 10. The transparent protection layer 9a may be made of indium tin oxide. The transparent protection layer 9a may have a light-transmittivity of not less than 90% under a condition of a vertical incident of a light having a wavelength in the range of 400–800 nanometers, provided that the light-transmittivity is represented by a ratio in quantity of a transmitted light to a vertically incident light.

The transparent protection layer 9a may also have a gas-permeability. After the transparent protection layer has been formed, a heat treatment may be carried out, whereby a gas is generated from the transparent organic material under the transparent protection layer. Since, however, the transparent protection layer has the gas-permeability, the generated gas is permeated through the transparent protection layer and discharged to an atmosphere, thereby causing no accumulation of the generated gas on the interface between the transparent protection layer and the planarized transparent organic surface. Such no accumulation of the generated gas does not cause the transparent protection layer to be peeled from the planarized transparent organic surface. For achieving the above effects, the transparent protection layer 9a may have a relative film density in the range of 50–90%, wherein the relative film density is represented by a volume ratio except for cavities and voids in the film.

The transparent protection layer 9a may have a thickness of at least about 15 nanometers for exhibiting a sufficient effect of protecting the planarized top surface of the transparent organic insulating layer 8 from sputtered particles in the sputter cleaning process or plasma particles in the plasma ashing process The thickness is more preferably in the range of at least about 20 nanometers to at most about 40 nanometers. If the thickness of the transparent protection layer is much thinner than 15 nanometers, then it is possible that the transparent protection layer does not exhibit the sufficient effect of protecting the planarized top surface of the transparent organic insulating layer 8 from the sputtered particles or the plasma particles. If the thickness of the transparent protection layer 9a is further increased from 40 nanometers, then no further advantage can be obtained.

A transparent pixel electrode layer 12 is further provided on a top surface of the transparent protection layer 9a and on the side walls and the bottom of the contact hole 10, so that the transparent pixel electrode layer 12 is in contact with the top surface of the first level interconnection layer 60, whereby the transparent pixel electrode layer 12 is electrically connected through the first level interconnection layer 60 to the drain electrode 6b. Preferably, the transparent pixel electrode layer 12 may be made of the same material as the transparent protection layer 9a, for example, indium tin oxide. The transparent pixel electrode layer 12 may have a thickness in the range of 30–100 nanometers.

A first orientation film 13-1 is provided on the top surface of the transparent pixel electrode layer 12 and within the contact hole 10. The display has an opposite substrate 16b. An opposite electrode 14 is provided on a surface of a second insulating substrate 16b. A second orientation film 13-2 is provided on the opposite electrode 14. A liquid crystal layer 15 is interposed between the first and second orientation films 13.

The structural characteristic of the display is the transparent protection layer 9a as described above. The transparent protection layer 9a is provided for protecting the planarized transparent organic surface from the sputtered particles in the sputter cleaning process for removing residues from the contact hole 10, whereby the planarized transparent organic surface is free from any damage and any deterioration in film quality by breaking molecular structure. After such a cleaning process, the layered structure keeps the planarized transparent organic surface which is free of any substantive or large roughness. This planarized transparent organic surface provides a high light-transmittivity.

The description will focus on the manufacturing process with reference to FIGS. 3A through 3K, which are fragmentary cross sectional views of liquid crystal displays in sequential steps involved in the novel manufacturing method in this first embodiment.

Figure 3A:
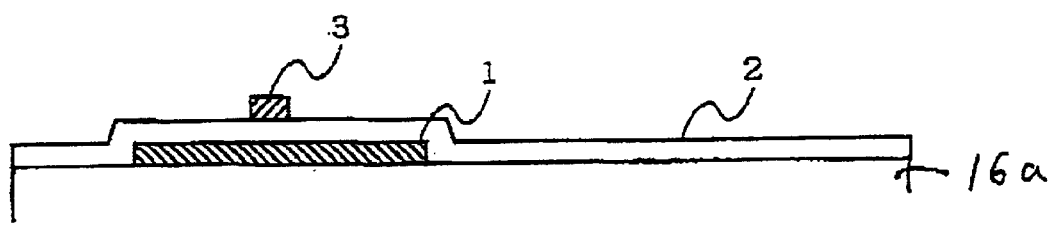

With reference to FIG. 3A, a silicon layer having a thickness in the range of 30–100 nanometers is deposited over entire regions of the first insulating substrate 16a by either a chemical vapor deposition method or a sputtering method. A photo-resist mask is formed on a selected region of a top surface of the silicon layer for subsequent anisotropic etching to the silicon layer with the photo-resist mask, thereby to form a thin film transistor silicon layer 1, which overlies on a predetermined region of the top surface of the first insulating substrate 16a. The silicon layer 1 may comprise a single crystal silicon layer or a polycrystal silicon layer. The used photo-resist mask is removed.

A gate insulating film 2 having a thickness in the range of 10–100 nanometers is entirely deposited by a chemical vapor deposition method or a sputtering method on the thin film transistor silicon layer 1 and the top surface of the substrate 16a. A metal or alloy film having a thickness in the range of 50–300 nanometers is non-selectively deposited by a chemical vapor deposition method or a sputtering method on entire regions of the top surface of the gate insulating film 2. A photo-resist mask is formed on a selected region of a top surface of the metal or alloy film for subsequent anisotropic etching to the metal or alloy film with the photo-resist mask, thereby to form a gate electrode 3 on a predetermined region of the top surface of the gate insulating film 2. The used photo-resist film is removed.

Figure 3B:
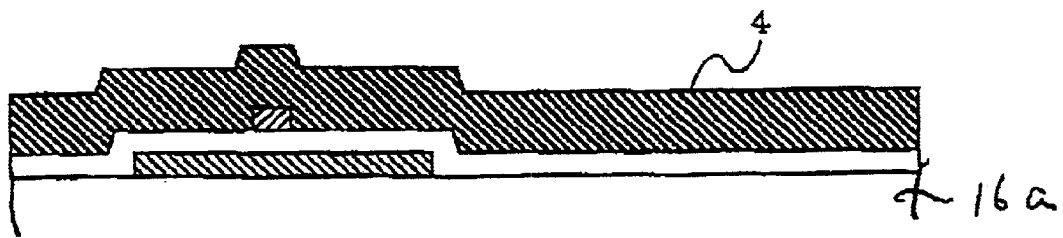
Figure 3C:
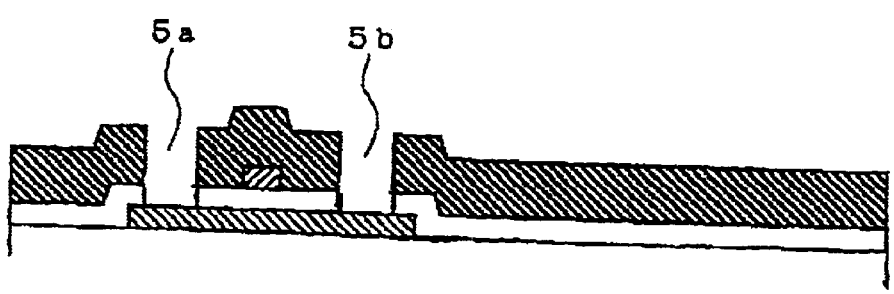

With reference to FIG. 3B, a first inter-layer insulator 4 having a thickness in the range of 100–500 nanometers is non-selectively deposited by a chemical vapor deposition method or a sputtering method over the gate electrode 3 and the gate insulting film 2. The first inter-layer insulator 4 has a stepped surface which comprises three-level stages. A photo-resist mask is formed on a selected region of a top surface of the first inter-layer insulator 4 for subsequent anisotropic etching to the first inter-layer insulator 4 with the photo-resist mask, thereby to form a pair of contact holes 5a and 5b in the lamination of the overlying first inter-layer insulator 4 and the underlying gate insulating film 2, so that the contact holes 5a and 5b reach parts of the top surface of the silicon layer 1. The used photo-resist film is removed.

Figure 3D:
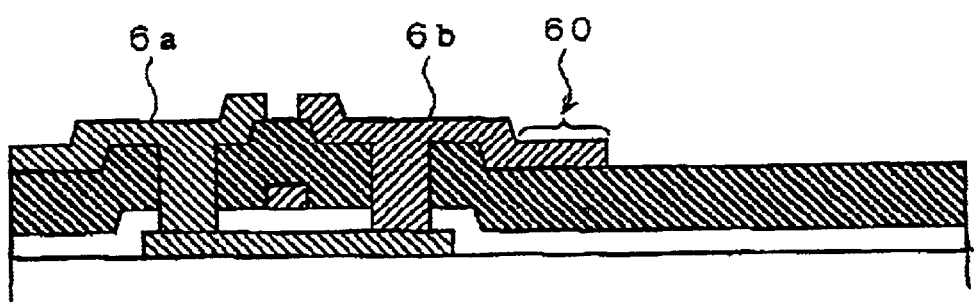

With reference to FIG. 3D, a metal layer such as an aluminum layer is non-selectively deposited by a chemical vapor deposition method or a sputtering method over a top surface of the first inter-layer insulator 4 and within the contact holes 5a and 5b. A photoresist mask is formed on a selected region of the top surface of the metal layer for subsequent anisotropic etching to the metal layer with the photo-resist mask, thereby to form source and drain electrodes 6a and 6b with contact plugs and first level interconnections 60, wherein the source and drain electrodes 6a and 6b are electrically connected through the first and second contact plugs in the contact holes 5a and 5b to the silicon layer 1. The first level interconnections 60 extend over the top surface of the first inter-layer insulator 4.

Figure 3E:
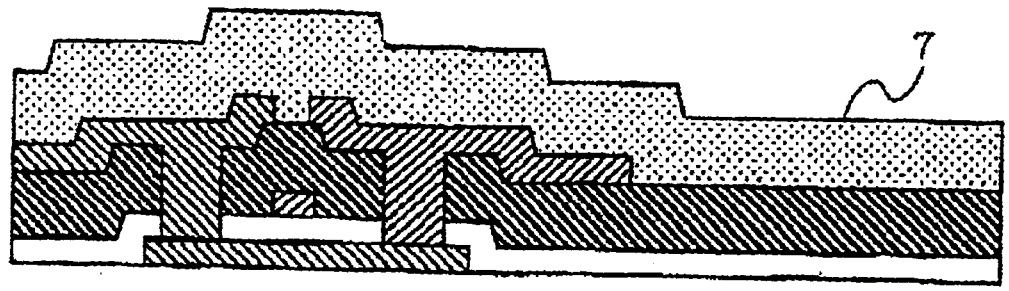

With reference to FIG. 3E, a second inter-layer insulator 7 having a thickness in the range of 300–800 nanometers is non-selectively deposited by a chemical vapor deposition method or a sputtering method, wherein the second inter-layer insulator 7 overlies the top surface of the first inter-layer insulator 4 and also over the source and drain electrodes 6a and 6b and the first level interconnection layers 60. The second inter-layer insulator 7 may be made of an inorganic insulating material, for example, silicon-based insulator such as silicon dioxide. The second inter-layer insulator 7 has a triplet-stepped surface which comprises four-level stages.

Figure 3F:
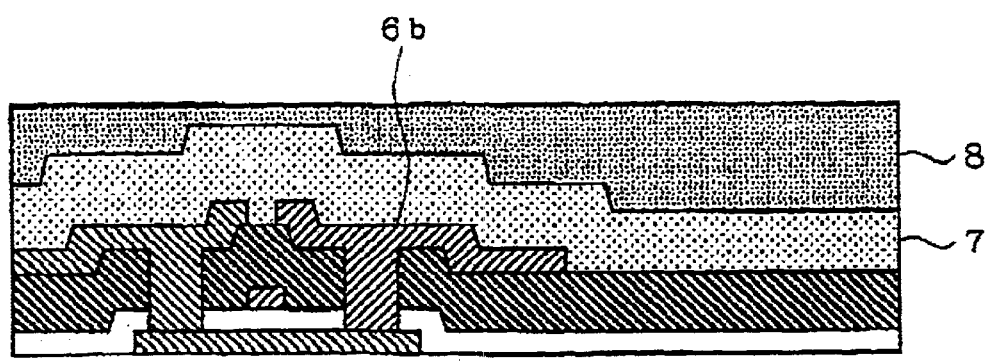

With reference to FIG. 3F, a transparent organic insulating layer 8 having a planarized top surface is non-selectively formed by a spin-coating method over entire regions of the second inter-layer insulator 7.

Figure 3G:
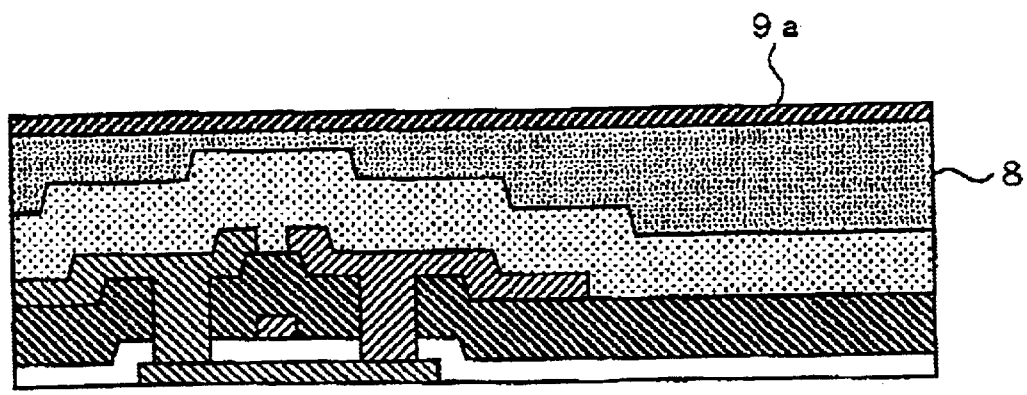

With reference to FIG. 3G, a transparent protection layer 9a is non-selectively formed by a sputtering method or a chemical vapor deposition method on entire regions of the planarized top surface of the transparent organic insulating layer 8. The transparent protection layer 9a may be made of indium tin oxide. The transparent protection layer 9a may have a light-transmittivity of not less than 90% under a condition of a vertical incident of a light having a wavelength in the range of 400–800 nanometers, formed that the light-transmittivity is represented by a ratio in quantity of a transmitted light to a vertically incident light. The transparent protection layer 9a may also have a gas-permeability. After the transparent protection layer has been formed, a heat treatment may be carried out, whereby a gas is generated from the transparent organic material under the transparent protection layer. Since, however, the transparent protection layer has the gas-permeability, the generated gas is permeated through the transparent protection layer and discharged to an atmosphere, thereby causing no accumulation of the generated gas on the interface between the transparent protection layer and the planarized transparent organic surface. Such no accumulation of the generated gas does not cause the transparent protection layer to be peeled from the planarized transparent organic surface. For achieving the above effects, the transparent protection layer 9a may have a relative film density in the range of 50–90%, wherein the relative film density is represented by a volume ratio except for cavities and voids in the film. If the transparent protection layer 9a is formed by the sputtering method, it is preferable that a sputter target has a similar relative density to the transparent protection layer 9a. If the transparent protection layer 9a is formed by a plasma enhanced chemical vapor deposition, then the film density can be reduced by reducing temperature, for example, at most 300° C., and also increasing pressure, for example, at least 1 Pa. The transparent protection layer 9a may be made of either indium tin oxide or silicon dioxide.

The transparent protection layer 9a may have a thickness of at least about 15 nanometers for exhibiting a sufficient effect of protecting the planarized top surface of the transparent organic insulating layer 8 from sputtered particles in the sputter cleaning process or plasma particles in the plasma ashing process. The thickness is more preferably in the range of at least about 20 nanometers to at most about 40 nanometers. If the thickness of the transparent protection layer is much thinner than 15 nanometers, then it is possible that the transparent protection layer does not exhibit the sufficient effect of protecting the planarized top surface of the transparent organic insulating layer 8 from the sputtered particles or the plasma particles. If the thickness of the transparent protection layer 9a is further increased from 40 nanometers, then no further advantage can be obtained.

Figure 3H:
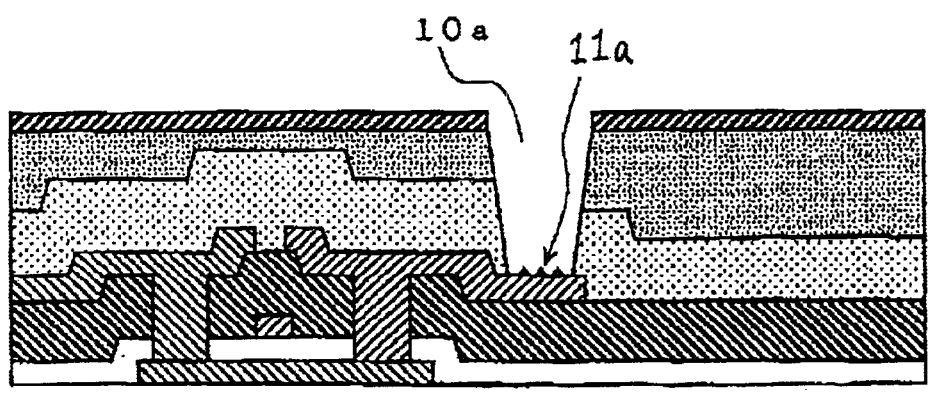
Figure 31:
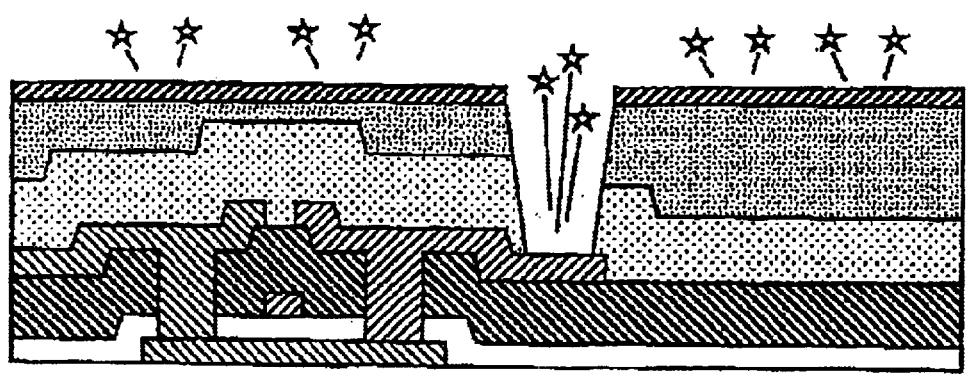
Figure 3J:
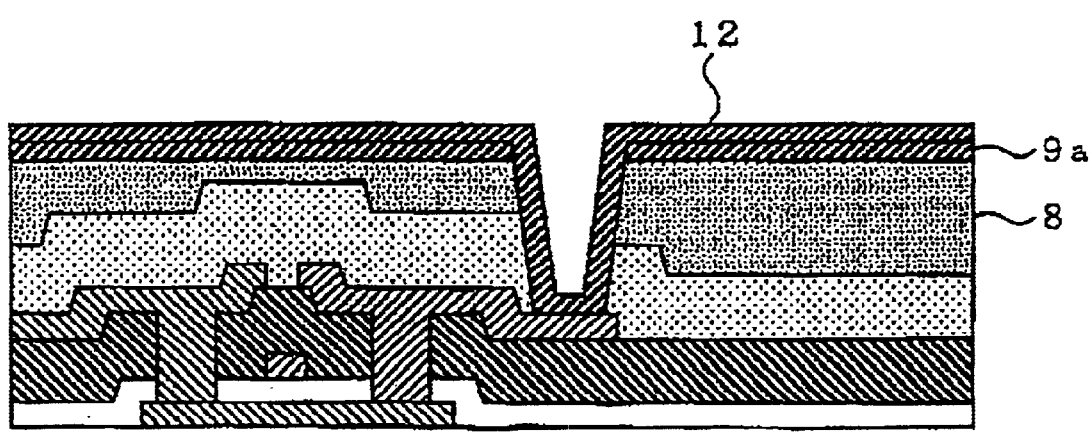

With reference to FIG. 3H, a photo-resist mask is formed on a selected region of the top surface of the transparent protection layer 9a for subsequent anisotropic etching, with the photo-resist mask, to laminations of the transparent protection layer 9a, the transparent organic insulating layer 8 and the second inter-layer insulator 7, thereby to form a contact hole 10a in such laminations, so that the contact hole 10a reaches a part of a top surface of the first level interconnection layer 60. During the anisotropic etching process, residues 11a reside in the contact hole 10a.

With reference to FIG. 3I, a sputter cleaning process is carried out for removing the residues 11a from the contact hole 10 with sputtered particles. This sputter cleaning process is equivalent in its technical meaning to the sputter etching process. During the sputter cleaning process, the transparent protection layer 9a protects the planarized surface of the transparent organic insulating layer 8 from the sputtered particles, so that the planarized surface is free from any damage and any deterioration in film quality by breaking molecular structure. The planarized surface of the transparent organic insulating layer 8 is free of any substantive or large roughness. Such a planarized transparent organic surface provides a high light-transmittivity.

Figure 4:
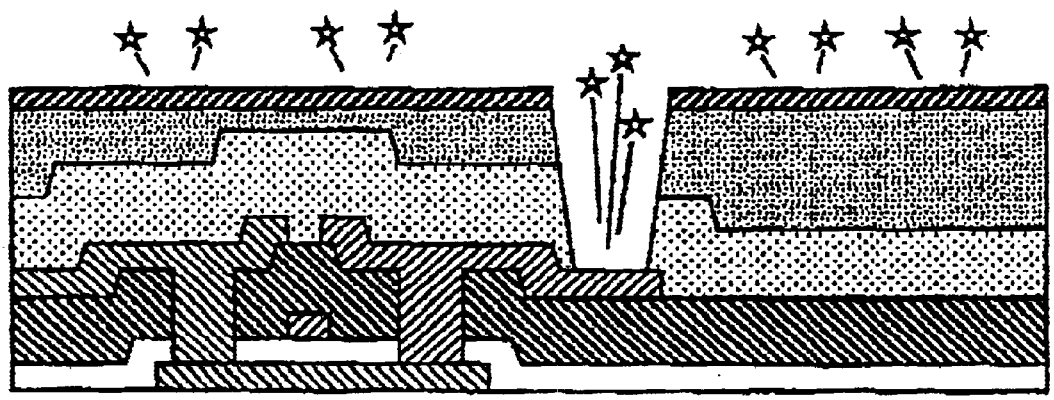
FIG. 4 is a fragmentary cross sectional view of alternatively available plasma ashing process in a modified embodiment in accordance with the present invention.

FIG. 4 is a fragmentary cross sectional view of alternatively available plasma ashing process. For the cleaning process, a plasma ashing process is also available instead of the sputter etching process. During the plasma ashing process, the transparent protection layer 9a also protects the planarized surface of the transparent organic insulating layer 8 from the plasma particles, so that the planarized surface is free from such damage and deterioration in film quality.

With reference back to FIG. 3J, a transparent pixel electrode layer 12 hang a thickness in the range of 30–100 nanometers is non-selectively deposited by a chemical vapor deposition or a sputtering method, wherein the transparent pixel electrode layer 12 overlies entire regions of a top surface of the transparent protection layer 9a and further extends on the side walls and the bottom of the cleaned contact hole 10, so that the transparent pixel electrode layer 12 is in contact with the top surface of the first level interconnection layer 60, whereby the transparent pixel electrode layer 12 is electrically connected through the first level interconnection layer 60 to the drain electrode 6b. The transparent pixel electrode layer 12 is made of indium tin oxide which is transparent and electrically conductive.

Figure 3K:
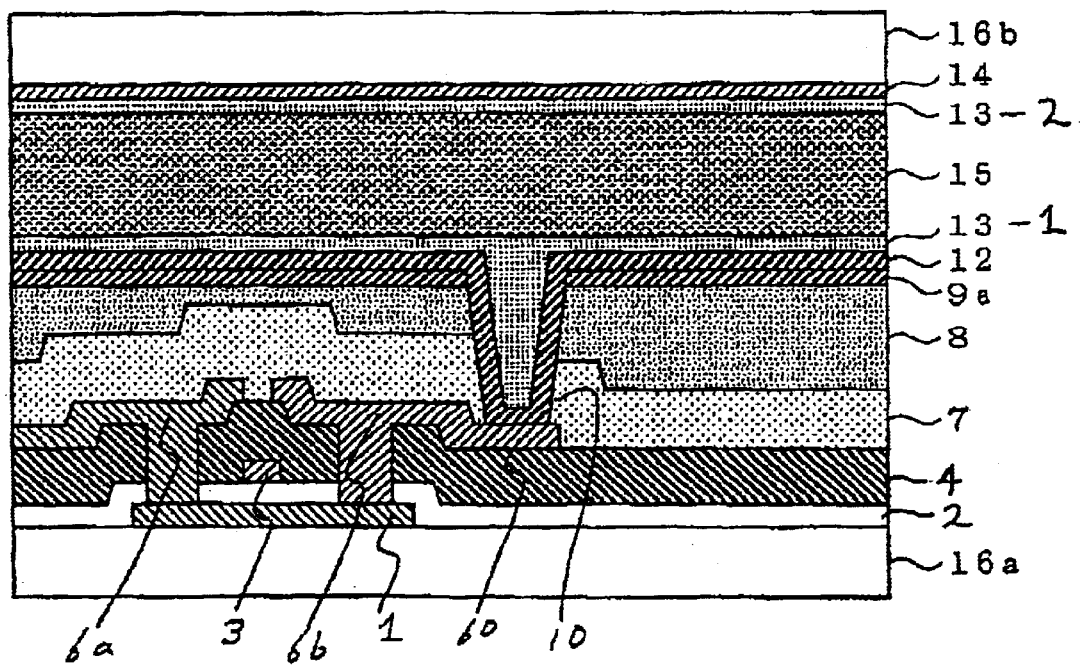

With reference to FIG. 3K, the know fabrication processes are carries out to complete the liquid crystal display.

As described above, the contact hole 10 is formed by the anisotropy etching to the above three laminated layers 9a, 8 and 7, which are however, different in etching rate. Such differences cause undesirable side etching of the transparent organic insulating layer 8, whereby the transparent protection layer 9a overhangs. In this case, it is preferable for preventing discontinuation of the transparent pixel electrode layer 12 that the transparent protection layer 9a is made of the same material as the transparent pixel electrode layer 12.

Not only indium tin oxide but also silicon dioxide are available for the transparent protection layer which is air-permeable. If the transparent protection layer is formed by the sputtering method, the use of indium tin oxide is suitable for obtaining a lower film density as compared to silicon dioxide.

The above gate electrode film may be formed at a low temperature of at most 350° C. The transparent organic insulating layer 8 may be formed at most 250° C. The transparent protection layer 9a is formed at most 200° C. to keep high light-transmittivity.

If silicon dioxide is used for the transparent protection layer, a higher etching stopper function in the sputter etching process can be obtained as compared to indium tin oxide, resulting in a reduced level difference which might suppress reverse-tilt of the liquid crystal, wherein plural liquid crystal domains co-exist, which have different tilting directions, thereby making it difficult to obtain a uniform view angle dependency of the display.

Further, in view of the high light-transmittivity, it is preferable that the transparent protection layer 9a is made of the same material as the transparent pixel electrode layer 12.

In order to prevent the transparent protection layer 9a from overhanging, the above described sequential processes may partially be modified.

FIGS. 5A through 5E are fragmentary cross sectional views of liquid crystal displays in different sequential steps in the alternative processes from the sequential steps of FIGS. 3A through 3K.

Figure 5A:
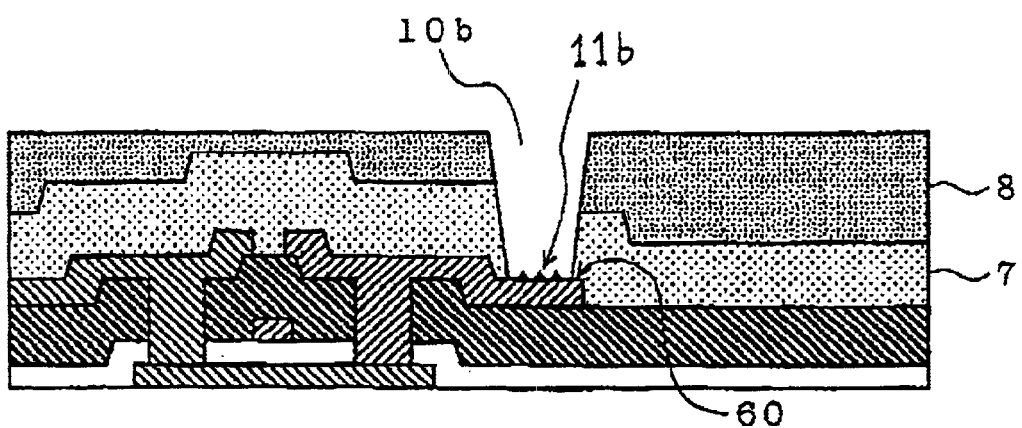
FIGS. 5A through 5E are fragmentary cross sectional views of liquid crystal displays in different sequential steps in the alternative processes from the sequential steps of FIGS. 3A through 3K.

After the step of FIG. 3F, as shown in FIG. 5A, a photo-resist mask is formed on a selected region of the top surface of the transparent protection layer 9a for subsequent anisotropic etching, with the photo-resist mask, to laminations of the transparent organic insulating layer 8 and the second inter-layer insulator 7, thereby to form a contact hole 10b in such laminations, so that the contact hole 10b reaches a part of a top surface of the first level interconnection layer 60. During the anisotropic etching process, residues 11b reside in the contact hole 10b.

Figure 5B:
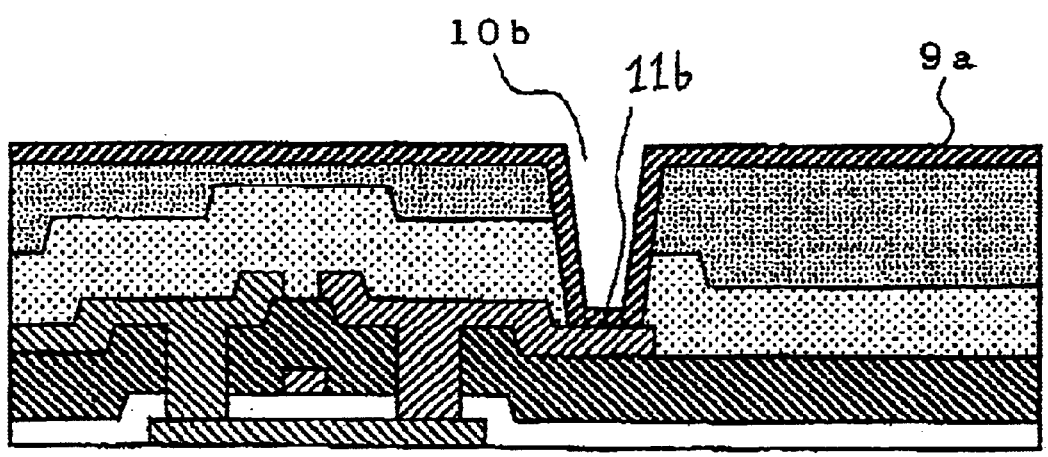

As shown in FIG. 5B, a transparent protection layer 9a is non-selectively formed by a sputtering method or a chemical vapor deposition method on entire regions of the planarized top surface of the transparent organic insulating layer 8 and also on side walls and a bottom of the contact hole 10b.

Figure 5C:
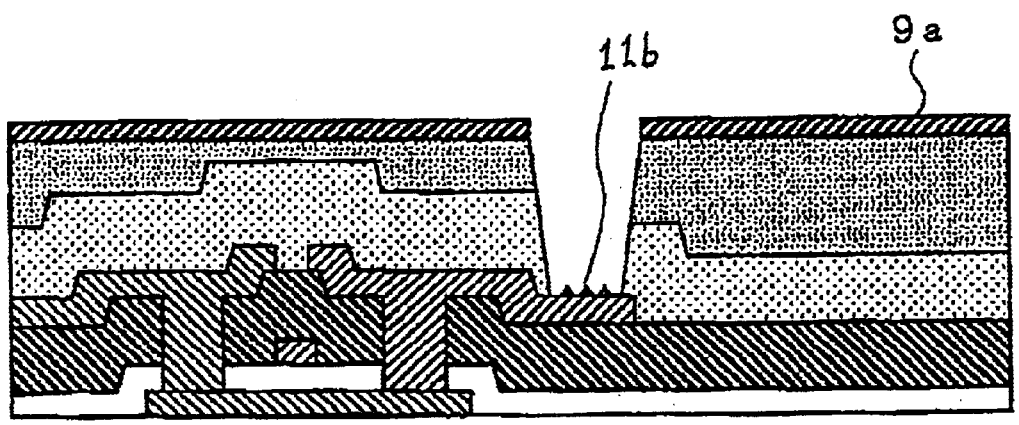

As shown in FIG. 5C, the transparent protection layer 9a is selectively etched from the contact hole 10b, so that the transparent protection layer 9a remains, only over the planarized top surface of the transparent organic insulating layer 8.

Figure 5D:
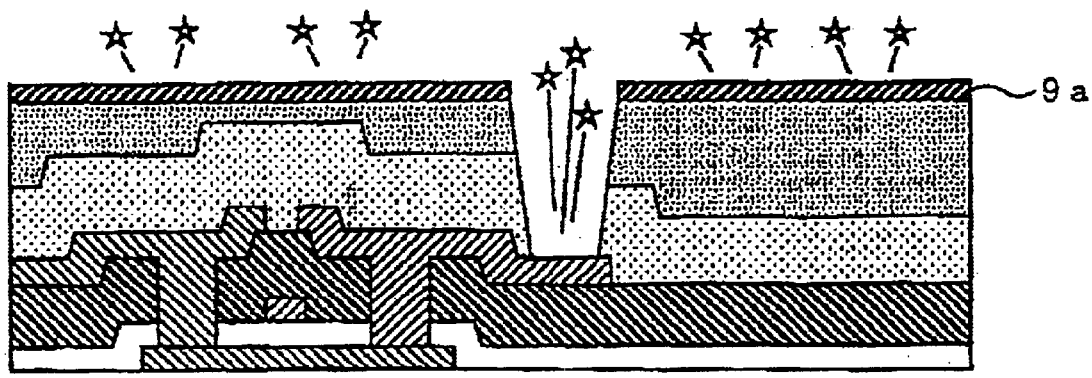

As shown in FIG. 5D, a sputter cleaning process is carried out for removing the residues 11b from the contact hole 10 with sputtered particles. This sputter cleaning process is equivalent in its technical meaning to the sputter etching process. During the sputter cleaning process, the transparent protection layer 9a protect the planarized surface of the transparent organic insulating layer 8 from the sputtered particles, so that the planarized surface is free from any damage and any deterioration in film quality by breaking molecular structure. The planarized surface of the transparent organic insulating layer 8 is free of any substantive or large roughness. Such a planarized transparent organic surface provides a high light-transmittivity.

Figure 6:
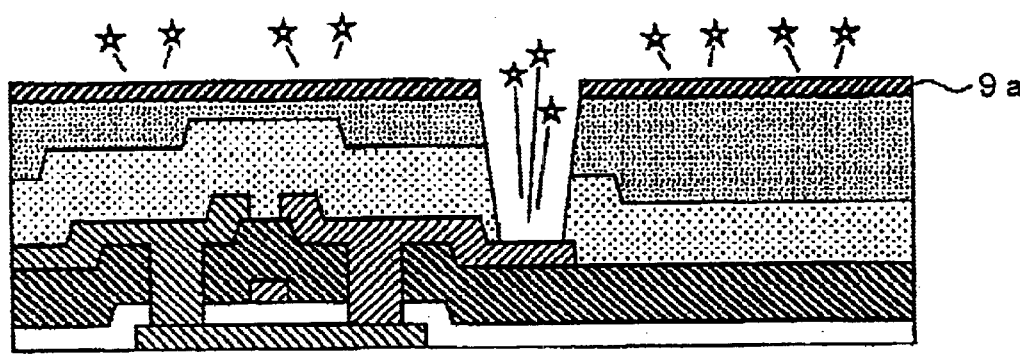
FIG. 6 is a fragmentary cross sectional view of alternatively available plasma ashing process in a modified embodiment in accordance with the present invention.

FIG. 6 is a fragmentary cross sectional view of alternatively available plasma ashing process. For the cleaning process, a plasma ashing process is also available instead of the sputter etching process. During the plasma ashing process, the transparent protection layer 9a also protects the planarized surface of the transparent organic insulating layer 8 from the plasma particles, so that the planarized surface is free from such damage and deterioration in film quality.

Figure 5E:
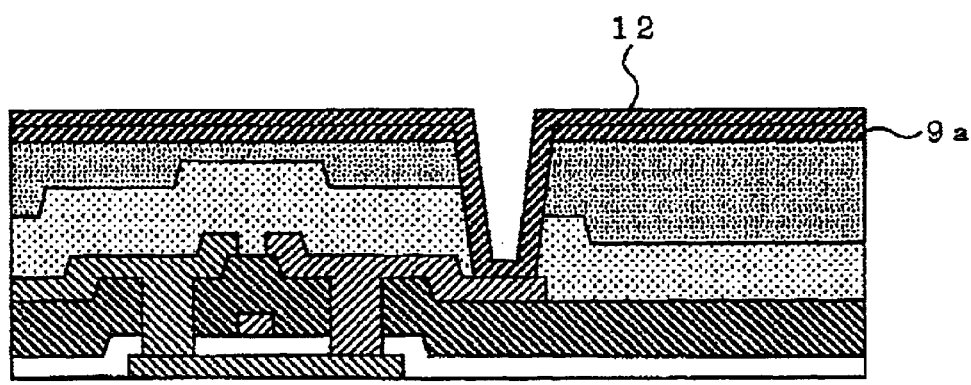

As shown in FIG. 5E, a transparent pixel electrode layer 12 having a thickness in the range of 30–100 nanometers is non-selectively deposited by a chemical vapor deposition or a sputtering method, wherein the transparent pixel electrode layer 12 overlies entire regions of a top surface of the transparent protection layer 9a and further extends on the side walls and the bottom of the cleaned contact hole 10, so that the transparent pixel electrode layer 12 is in contact with the top surface of the first level interconnection layer 60, whereby the transparent pixel electrode layer 12 is electrically connected through the first level interconnection layer 60 to the drain electrode 6b. The transparent pixel electrode layer 12 is made of indium tin oxide which is transparent and electrically conductive.

In accordance with the modified sequential processes, the contact hole 10 is formed before the transparent protection layer 9a is formed, so that the transparent protection layer is free of any overhanging.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A method for cleaning a hole in a layered structure having a planarized transparent organic surface, comprising the steps of:

removing residue from the hole by exposing said hole to sputtered particles or plasma particles in the presence of a transparent protection layer which covers said planarized transparent organic surface, except within said hole, for protecting said planarized transparent organic surface from being roughened by said particles; and depositing a transparent pixel electrode layer onto the transparent protection layer;

wherein the transparent protection layer comprises an electrically conductive material, both the transparent protection layer and the transparent pixel electrode layer comprise indium tin oxide, and the transparent protection layer is formed at a temperature of at most 200° C.

2. The method as claimed in claim 1, wherein said transparent protection layer has a light-transmittivity of not less than 90% under a condition of a vertical incident of a light having a wavelength in the range of 400–800 nanometers.

3. The method as claimed in claim 1, wherein said transparent protection layer is gas-permeable.

4. The method as claimed in claim 3, wherein said transparent protection layer has a relative film density in the range of 50–90%.

5. The method as claimed in claim 1, wherein said transparent protection layer has a thickness of at least about 15 nanometers.

6. The method as claimed in claim 1, wherein said layered structure comprises laminations of an underlying inorganic inter-layer insulator and an overlying transparent organic insulating layer having said planarized transparent organic surface.

7. The method as claimed in claim 1, wherein said hole comprises a contact hole.

8. The method as claimed in claim 1, wherein said hole comprises a through hole.

9. The method as claimed in claim 1, wherein said exposing step comprises a sputter cleaning process using said sputtered particles.

10. The method as claimed in claim 1, wherein said exposing step comprises a plasma-ashing process using said plasma particles.

11. A method of forming a hole in a layered structure having a planarized transparent organic surface, said method comprising the steps of:

forming a transparent protection layer which covers said planarized transparent organic surface;

carrying out an anisotropic etching for selectively etching said transparent protection layer and said layered structure to form a hole in said layered structure;

removing residue from the hole by exposing said hole to sputtered particles or plasma particles in the presence of the transparent protection layer which covers said planarized transparent organic surface, except within said hole, the transparent protection layer protecting said planarized transparent organic surface from being roughened by said particles; and depositing a transparent pixel electrode layer onto the protection layer;

wherein the transparent protection layer comprises an electrically conductive material, both the transparent protection layer and the transparent pixel electrode layer comprise indium tin oxide, and the transparent protection layer is formed at a temperature of at most 200° C.

12. The method as claimed in claim 11, wherein said transparent protection layer has a light-transmittivity of not less than 90% under a condition of a vertical incident of a light having a wavelength in the range of 400–800 nanometers.

13. The method as claimed in claim 11, wherein said transparent protection layer is gas-permeable.

14. The method as claimed in claim 13, wherein said transparent protection layer has a relative film density in the range of 50–90%.

15. The method as claimed in claim 11, wherein said transparent protection layer has a thickness of at least about 15 nanometers.

16. The method as claimed in claim 11, wherein said layered structure comprises laminations of an underlying inorganic inter-layer insulator and an overlying transparent organic insulating layer having said planarized transparent organic surface.

17. The method as claimed in claim 11, wherein said hole comprises a contact hole.

18. The method as claimed in claim 11, wherein said hole comprises a through hole.

19. The method as claimed in claim 11, wherein said exposing step comprises a sputter cleaning process using said sputtered particles.

20. The method as claimed in claim 11, wherein said exposing step comprises a plasma-ashing process using said plasma particles.

21. A method of forming a hole in a layered structure having a planarized transparent organic surface, said method comprising the steps of:

carrying out an anisotropic etching for selectively etching said layered structure to form a hole in said layered structure;

forming a transparent protection layer on said planarized transparent organic surface and on a bottom and side walls of said hole;

selectively removing said transparent protection layer from said bottom and said side walls of said hole, so as to leave said transparent protection layer on said planarized transparent organic surface only; and exposing said hole to sputtered particles or plasma particles in the presence of a transparent protection layer which covers said planarized transparent organic surface, except within said hole, for protecting said planarized transparent organic surface from said particles.

22. The method as claimed in claim 21, wherein said transparent protection layer has a light-transmittivity of not less than 90% under a condition of a vertical incident of a light having a wavelength in the range of 400–800 nanometers.

23. The method as claimed in claim 21, wherein said transparent protection layer is gas-permeable.

24. The method as claimed in claim 23, wherein said transparent protection layer has a relative film density in the range of 50–90%.

25. The method as claimed in claim 21, wherein said transparent protection layer has a thickness of at least about 15 nanometers.

26. The method as claimed in claim 21, wherein said layered structure comprises laminations of an underlying inorganic inter-layer insulator and an overlying transparent organic insulating layer having said planarized transparent organic surface.

27. The method as claimed in claim 21, wherein said hole comprises a contact hole.

28. The method as claimed in claim 21, wherein said hole comprises a through hole.

29. The method as claimed in claim 21, wherein said exposing step comprises a sputter cleaning process using said sputtered particles.

30. The method as claimed in claim 21, wherein said exposing step comprises a plasma-ashing process using said plasma particles.

* * * * *